United States Patent [19]

Yamada

[11] 4,297,134
[45] Oct. 27, 1981

[54] METHOD OF RECOVERING GOLD

[76] Inventor: Keita Yamada, Asaka Riken Kohyo Co., Ltd., 47 Aza Maseguchi, Tamura-cho, Kanaya, Koriyama, Fukushima-ken, Japan

[21] Appl. No.: 165,716

[22] Filed: Jul. 3, 1980

[30] Foreign Application Priority Data

Dec. 27, 1979 [JP] Japan .................................. 54-173793

[51] Int. Cl.$^3$ .............................................. C22B 11/06
[52] U.S. Cl. ............................ 75/118 R; 75/101 BE; 75/108; 423/24; 423/35; 423/40
[58] Field of Search ........... 75/118 R, 118 P, 101 BE, 75/108; 423/24, 40, 35

[56] References Cited

U.S. PATENT DOCUMENTS

| | | | |
|---|---|---|---|
| 440,143 | 11/1890 | Dode | 75/118 R X |
| 3,397,040 | 8/1968 | Lakin et al. | 75/118 R X |
| 3,576,620 | 4/1971 | Wilson | 75/118 R X |
| 3,771,996 | 11/1973 | Short | 75/0.5 A |
| 3,843,379 | 10/1974 | Daiga et al. | 75/118 R X |
| 3,885,955 | 5/1975 | Lutz et al. | 75/0.5 A |
| 3,935,006 | 1/1976 | Fischer | 75/118 R |

*Primary Examiner*—G. Ozaki
*Attorney, Agent, or Firm*—Fleit & Jacobson

[57] ABSTRACT

A process for recovering gold from a raw material containing gold by treating the raw material with either aqua regia or hydrochloric acid to form chloroauric acid, extracting the chloroauric acid with an organic solvent and reducing the acid to precipitate gold for separation and recovery.

3 Claims, No Drawings

METHOD OF RECOVERING GOLD

BACKGROUND OF THE INVENTION

1. Field of the Invention

The present invention relates to a method of recovering gold from a raw material containing gold. Specifically, the present invention relates to a method of recovering gold from a raw material having a wide range of gold content, i.e., from a small percentage of gold, such as less than 1%, to a high percentage, over 75%.

2. Description of the Prior Art

Heretofore, an electrolytic refining method or a method employing cyanide have been used to recover gold from a raw material containing a small percentage of gold. The electrolytic technique, however, had the disadvantage in that the pH of the liquid in the electrolytic cell was difficult to control and, further, that the gold could not be recovered in a highly efficient manner, since a large quantity of metals other than gold in the raw material were dissolved in the electrolytic liquid. The method employing cyanide was difficult to perform in a practical manner, since the gold was contained in a slurry of plastic, etc., and since the recovery process consisted primarily of a filtration step.

It is, therefore, an object of the present invention to provide a method of recovering gold having a high efficiency and producing gold of a high purity from a raw material without affecting the components of the gold-containing material other than the gold itself.

Further objects and advantages of the present invention will become apparent upon reading the undergoing specification and claims.

SUMMARY OF THE INVENTION

The present invention involves conversion of the gold contained in a raw gold-containing material to chloroauric acid and extraction with an organic solvent. Specifically, a raw material containing gold is first treated with 6 to 7 N HCl solution or aqua regia. The chloroauric acid thus formed is extracted with an organic solvent, such as ethyl ether or methyl isobutyl ketone (MIBK) or the like, or a solvent mixture of the organic solvent with isoamyl acetate. The chloroauric acid in the organic solvent may then be stripped into the aqueous layer as gold hydroxide by the addition of an alkaline solution to the organic solvent. The gold is allowed to precipitate by adding a reducing agent to the chloroauric acid solution, generally after its reformation by the addition of hydrochloric acid to the stripped gold hydroxide. The gold precipitate is then separated by, for example, filtering with suction and is then recovered by, for example, drying and fusion.

DESCRIPTION OF THE PREFERRED EMBODIMENT

Aqua regia having a $HNO_3/HCl$ ratio of about ⅓ or a 6 to 6.5 normal hydrochloric acid solution is added to a raw material containing gold, heated to a temperature from 100° to 130° C. and then cooled to room temperature. Then, an organic solvent such as MIBK, ethyl ether or a mixed organic solvent of MIBK and isoamyl acetate is added to the acid solution, and the entire system is shaken to extract the gold in the raw material as chloroauric acid. This extracting step has the advantage that it can increase the efficiency of the present method in an automatic operation.

The gold is dissolved in the acid solution as chloroauric acid ($HAuCl_4$). Chloroauric acid, however, is more stable in an organic solvent than in an aqueous solution because it exists as an ionic association. The organic solvent employed in the present extracting process, therefore, should (1) be difficult to pyrolyze, (2) by strongly alkaline, (3) have a low poison content, (4) have a high flash point and (5) be widely selective with respect to extraction of gold. Accordingly, MIBK is an especially excellent solvent. The mixed solvent of MIBK and isoamyl acetate is weakly alkaline and easily sapponified compared to MIBK, but selectively extracts metals having a triple valency such as gold, iron etc., and hardly extracts metals having either a double valency such as platinum or a single valency such as silver.

After completing the extraction, the organic phase is separated and washed to remove impurities. Impurities may be removed, for instance, by adding a 5 to 8 normal, preferably 7 normal, solution of hydrochloric acid. Then, a 30 to 50%, preferably 40%, solution of NaOH is added to the organic phase which is then shaken. As a result, the chloroauric acid ($HAuCl_4$) in the organic phase reacts with the NaOH to strip the gold into the aqueous phase as gold hydroxide ($Au(OH)_3$).

The selectivity of the stripping step may be enhanced by using $NH_4OH$ as an alternative to NaOH. Selectivity is enhanced because impurities dissolved in the solution form a complex salt with the ammonium ion, so only the gold is precipitated. However, $NH_4OH$ has undesirable characteristics, since gold precipitated thereby is called "fulminating gold" (a complex salt with ammonium ion) and is explosive.

Following either course, the gold in the solvent is thus precipitated completely after several repetitions of the stripping operation. Then, the organic phase is separated from the aqueous phase. This stripping process has an advantage, since its efficiency may be increased by automation.

The gold hydroxide in the separated aqueous phase is then reacted with a 3 to 5 normal, preferably 4 normal, solution of hydrochloric acid as follows:

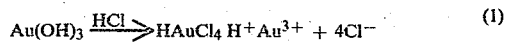

$$Au(OH)_3 \xrightarrow{HCl} HAuCl_4\ H^+Au^{3+} + 4Cl^- \tag{1}$$

The chloroauric acid formed by this reaction is stable in aqueous solution. Gold is precipitated by the following reaction (2) when sodium sulphite ($Na_2SO_3$) is added as a reducing agent to the solution containing hydrocholoric acid after heating.

$$HAuCl_4 \xrightarrow{Na_2SO_3} Au \tag{2}$$

The gold thus precipitated is separated by, for example, suction filtration using a Buchner funnel or the like. The gold is then dried and fused to produce solid gold.

The following examples are included to illustrate the results of conducting the process in accordance with the present invention. These examples are merely illustrative and are not intended as a limitation on the present invention.

EXAMPLE 1

1,000 g of an 18 K gold decorative article containing 75.0% of gold is used as the raw material. Practicing the present method, 749.1 g of pure gold having a purity of 99.99% was obtained. The yield of recovery is 99.88%.

EXAMPLE 2

A scrap of a manufactured article containing 0.2% of gold is used as the raw material. 198.7 g of crude gold having a purity of 99.0% is obtained from 100 Kg of the raw material after crushing and powdering. The yield of the recovery is 98.3%.

EXAMPLE 3

100 liters of waste gold plating liquids containing 7.2 g of Au/l are treated in a closed reaction apparatus and HCN is fractionated. Then, the HCN is recovered with NaOH as NaCN. Using this treated solution as the raw material, 716 g of gold having a purity of 99.2% is obtained. The yield of recovery is 98.6%.

EXAMPLE 4

1 ton of neutralized sludge containing 0.01 g/Kg of gold is used as the raw material. 9.1 g of crude gold having a purity of 98.8% is obtained. The yield of recovery is 92.1%.

As can be seen from the above, gold is not only recovered in a highly efficient manner from a raw material having a low gold content or from one having a high gold content, but the percentage of recovery is not influenced by the condition of the raw material, which may be a solid, liquid or slurry.

The method of the present invention has the following additional advantages over those conventionally employed.

(1) Recovery time is short.

(2) Continuous automation of the entire process is possible to provide increased efficiency.

(3) The organic solvent can be recovered and reused.

(4) The present recovery method can be conducted with very simple apparatus and at a low cost without the need for an electrolytic cell or a rectifier as in the prior art electrolytic method.

(5) Gold can be recovered very easily even from a raw material which is difficult to filter, such as a slurry.

Although one specific embodiment of the present invention has been described above, it should be understood that this embodiment is described for illustrative purposes only and that numerous alterations and modifications can be practiced by those skilled in the art without departing from the scope of the invention. Accordingly, it is the intent that the present invention not be limited by the above, but be limited only as defined in the appended claims.

I claim:

1. A process for recovering gold from a raw material containing gold comprising the steps of treating the raw material with either aqua regia or 6.0 to 6.5 normal hydrochloric acid to form chloroauric acid; extracting the chloroauric acid with an organic solvent selected from the group consisting of ethyl ether, methyl isobutyl ketone and a mixture of methyl isobutyl ketone and isoamyl acetate; separating and washing the organic solvent; stripping the gold contained in the organic solvent into an aqueous phase as gold hydroxide by adding a 30 to 50% solution of NaOH or $NH_4OH$ to the organic solvent and agitating the resulting mixture; separating the aqueous layer; reacting the gold hydroxide in the aqueous layer with 3 to 5 normal hydrochloric acid to form chloroauric acid; reducing the chloroauric acid to precipitate the gold; and separating and recovering the gold.

2. The process of claim 1, wherein the reducing step is accomplished by the addition of sodium sulfite.

3. A process for recovering gold from materials containing gold comprising the steps of:
  (a) adding sufficient quantities of reagent selected from the group consisting of HCl and aqua regia, to a gold-containing material and heating the resulting mixture to between about 100° to 130° C., whereby a major portion of the gold is converted to chloroauric acid;
  (b) cooling the mixture containing chloroauric acid to about ambient conditions and adding thereto an organic solvent selected from the group consisting of methyl isobutyl ketone, ethyl ether and mixtures of methyl isobutyl ketone and isoamyl acetate, whereby there are formed a first aqueous phase and a first organic phase;
  (c) intimately mixing the first aqueous phase and the first organic phase;
  (d) separating the first organic phase from the first aqueous phase, the first organic phase containing substantially all of the chloroauric acid;
  (e) washing the first organic phase with 5 to 8 N hydrochloric acid;
  (f) mixing the first organic phase with an aqueous solution containing 30 to 50% of a reagent selected from the group consisting of sodium hydroxide and ammonia hydroxide, wherein a second aqueous phase is formed containing gold hydroxide, the chloroauric acid having been converted to gold hydroxide;
  (g) separating the second aqueous phase containing gold hydroxide;
  (h) reacting the second aqueous phase containing gold hydroxide with sufficient quantities of between about 3 to 5 N HCl to convert the gold in the second aqueous phase to chloroauric acid;
  (i) reacting the aqueous phase with a reducing agent whereby elemental gold is precipitated from solution; and
  (j) recovering elemental gold.

* * * * *